United States Patent [19]
DeVilbiss et al.

[11] Patent Number: 5,682,748
[45] Date of Patent: Nov. 4, 1997

[54] POWER CONTROL CIRCUIT FOR IMPROVED POWER APPLICATION AND TEMPERATURE CONTROL OF LOW VOLTAGE THERMOELECTRIC DEVICES

[75] Inventors: Roger S. DeVilbiss, Dallas; Tony M. Quisenberry, Highland Village, both of Tex.; Harry C. Powell, Jr., Shipman, Va.

[73] Assignee: Thermotek, Inc., Carrollton, Tex.

[21] Appl. No.: 502,755

[22] Filed: Jul. 14, 1995

[51] Int. Cl.$^6$ ............................................. F25B 21/02
[52] U.S. Cl. ......................................................... 62/3.7
[58] Field of Search ................... 62/3.2, 3.7, 226, 62/227, 229, 3.1; 307/116, 117, 135; 363/74, 123, 125, 127; 236/74 R, 78 R, 78 D

[56] References Cited

U.S. PATENT DOCUMENTS

| | | | |
|---|---|---|---|
| 3,111,008 | 11/1963 | Nelson | 62/3 |
| 3,123,980 | 3/1964 | Steimel | 62/3.7 X |
| 3,206,937 | 9/1965 | Walisch et al. | 62/3.7 X |
| 3,967,627 | 7/1976 | Brown | 128/400 |
| 4,293,762 | 10/1981 | Ogawa | 219/302 |
| 4,301,658 | 11/1981 | Reed | 62/3 |
| 4,338,944 | 7/1982 | Arkans | 128/400 |
| 4,476,685 | 10/1984 | Aid | 62/3 |
| 4,494,380 | 1/1985 | Cross | 62/3 |
| 4,587,563 | 5/1986 | Bendell et al. | 358/213 |
| 4,680,445 | 7/1987 | Ogawa | 219/299 |
| 4,833,888 | 5/1989 | Kerner et al. | 62/3.3 |
| 4,844,072 | 7/1989 | French et al. | 128/400 |
| 4,919,134 | 4/1990 | Streeter | 128/400 |
| 4,935,864 | 6/1990 | Schmidt et al. | 363/141 |
| 4,962,761 | 10/1990 | Golden | 128/400 |
| 5,035,052 | 7/1991 | Suzuki et al. | 29/890.046 |
| 5,043,560 | 8/1991 | Masreliez | 219/497 |
| 5,097,829 | 3/1992 | Quisenberry | 128/400 |
| 5,128,517 | 7/1992 | Bailey et al. | 219/506 |
| 5,128,854 | 7/1992 | Raets | 363/89 |
| 5,213,152 | 5/1993 | Cox | 165/5 |
| 5,402,480 | 3/1995 | Hirahara | 363/127 X |
| 5,568,372 | 10/1996 | Smith | 363/74 |

FOREIGN PATENT DOCUMENTS

| | | |
|---|---|---|
| 2417974 | 10/1979 | France . |
| 4036210A1 | 5/1992 | Germany . |

*Primary Examiner*—Harry B. Tanner
*Attorney, Agent, or Firm*—Jenkens & Gilchrist, a Professional Corporation

[57] ABSTRACT

A power control circuit for improved temperature control of thermoelectric devices to maintain the temperature of thermoelectric devices at a set point. The circuit includes a rectifying device to provide rectified alternating current when receiving an input from an electrical power source; a flyback power supply to supply a DC voltage to the thermoelectric device; a switching device to modulate the rectified alternating current across the primary of the flyback transformer; sensor circuitry to monitor the temperature of the thermoelectric device; and a programmable control device to receive an output from the sensor circuitry and provide a control signal to the switching device, the control signal being determined by the difference between the sensed temperature of the thermoelectric device and the desired set point to allow the DC voltage to the thermoelectric device to bring the temperature of the thermoelectric device to the set point and maintain the temperature of the thermoelectric device at the set point.

22 Claims, 2 Drawing Sheets

POWER CONTROL CIRCUIT FOR IMPROVED POWER APPLICATION AND TEMPERATURE CONTROL OF LOW VOLTAGE THERMOELECTRIC DEVICES

BACKGROUND OF THE INVENTION

1. Field of the Invention

The present invention relates to thermoelectric cooling devices. More particularly, but not by way of limitation, the present invention relates to a power supply and control circuit incorporating an improved design for supplying power to low voltage thermoelectric cooling devices and improved temperature control of the low voltage thermoelectric cooling devices.

2. History of the Prior Art

The development of thermoelectric cooling (TEC) devices has revolutionized the cooling industry. Conventional cooling has typically required the expansion and compression of gases, such as Chloroflorocarbons (CFC's) and Hydrochloroflorocarbons (HCFC's) to effect the absorption of heat for lowering the temperature of a fluid flowing in association therewith. Unfortunately, these substances are damaging to the earth's ozone layer and are being phased out in future years. The development of solid state cooling systems in the form of TEC devices, has permitted small commercial packages to be developed that are capable of precise temperature control in a variety of applications where environmental concern, size, weight, performance, and noise are at issue.

The most typical TEC device incorporates a thermoelectric module/component that utilizes electrical current to absorb heat from one side of the module and dissipate the heat on the opposite side. If the current direction is reversed, so is the heat pumping. Generally, cold sides and hot sides are developed necessitating an effective means of removing or adding heat from or to a solid, liquid or a gas (typically air).

An example of such an application of a TEC device is seen in U.S. Pat. No. 5,097,829 (the '829 patent) for a temperature controlled cooling system. In this patent, the advantages of medically therapeutic cooling of a wound site on a body are discussed. Initial use of cooling therapy was mainly found in the field of orthopedics. It is now found that post surgical cooling is highly beneficial in the reduction of trauma to the patient. It also increases the rate of healing and reduces the length of a hospital stay. In addition, cooling therapy is also being used in home health care for chronic pain control and to increase joint flexibility and facilitate the rate of healing.

In a more precisely controlled temperature application, cooling can take place at a deep penetration for an extended period. Thus, it is highly desirable to be able to maintain precise control of the temperature which is actually contacting the tissue of a wound site and then sustain that temperature for a substantial period of time. In this manner, the advantages obtained from the use of cold therapy in a medical application can be vastly increased. This can be done with TEC devices as shown in the '829 patent.

It would be advantageous to improve the temperature control of thermoelectric cooling devices while reducing the number of parts and reducing the cost of providing improved temperature control.

One of the most ubiquitous problems in the area of industrial control is that of temperature regulation. Variations in ambient temperature, process loading, and power input must all be accounted for in such a manner that the controlled system will reach an equilibrium point in a reasonable time, and oscillations in temperature will be minimized. There are two generally used control methods or systems to accomplish this end: Thermostatic Control and Proportional-Integral-Derivative (PID) control.

The simplest method or system is thermostatic control which is exemplified by a typical home thermostat. In this system, full power is applied to the thermal generator until the desired set point is reached, whereupon the power is removed and the system "coasts" back below the set point. This system is characterized by temperature fluctuations above and below the set point but is extremely economical to implement.

The second method or system is PID and is the most common form of industrial temperature control. In this method, the output of the thermal generator is regulated in a linear fashion, such that just enough power is supplied to the load to make up for losses in the system. The amount of power applied to the load is computed from three factors, hence the term PID. The first factor is the proportional term, which is a measure of the error at any particular instant. This temperature error is multiplied by the proportional gain factor and applied in a direction such as to reduce the total error. The second factor is the integral term which is simply the time integral of the temperature error. The integral term is used to "help" the proportional term in driving the temperature error to zero. The third factor is the derivative term and is calculated as the rate of change of the temperature and is used as a "brake" on the other two terms when the temperature is changing rapidly. These three terms are added algebraically to give the final power input value to the thermal generator. This system is capable of giving excellent temperature control where the heat load is essentially constant but requires that the temperature be known to a high degree of resolution in order to make use of the various gain terms.

There is also a need for power supplies and the temperature controlling of thermoelectric cooling devices in the one hundred watt or less range for various cooling applications. Present power supply/temperature controllers for low voltage, twenty-four volts DC or less, thermoelectric coolers applications are standard single voltage output switching power supplies or linear power supplies that use pulse width modulation (PWM) on the DC side to vary the amount of cooling. This approach is less efficient than adjusting the DC voltage (to the thermoelectric device) up or down depending upon the heat pumping requirements. Using PWM control, the hot side of the thermoelectrics are maintained at a higher temperature at DC voltages that are less than $V_{max}$. In addition, PWM control is more likely to cause electromagnetic interference due to the high switching frequencies and currents that are required for this approach.

Another approach that is commonly used is a thermostatic control of the thermoelectric device using a set voltage power supply. This approach is inexpensive but it does not provide tight temperature control as compared with a proportional controller and is less efficient due to the hot side temperature rise when full power is applied. The thermostatic approach damages the thermoelectric coolers over time due to the thermal stresses in the thermoelectric material when no power and full power are applied over time.

Another approach is the use of pulse position power supplies for low voltage, 36 volts or less, thermoelectric cooler applications. In the pulse position approach, the high current transistor is turned on until it reaches the voltage necessary to obtain the desired amount of cooling. With voltages required to be in the range between zero volts DC to 36 volts DC, the high current transistor is on for a very short period of time and it takes a large amount of current to charge the filter capacitor and provide power to the thermoelectric. In addition, the resolution and the method of current consumption from the standard 115 VAC power line is not optimal since the time to charge the capacitor is minimal and thereby, the temperature control resolution is minimized. Since the accuracy at the low voltage end of the pulse position approach is limited, another approach must be used to provide the thermoelectric coolers with linear voltage control from zero volts DC to twelve or twenty-four volts DC, depending upon the application.

The present invention provides an improvement over the prior art by providing an incremental smooth DC voltage for temperature controlling thermoelectric cooling devices in the 100 watts or less range of cooling applications and reduces the parts count and cost and improves reliability while the power consumption from the power line is more uniform and efficient.

SUMMARY OF THE INVENTION

One aspect of the present invention comprises a low cost, isolated flyback switching power supply incorporating a component which integrates a high power MOSFET transistor and a PWM circuit together with an inexpensive microcontroller to provide temperature control to thermoelectric devices with power consumption of one hundred watts or less in the most efficient manner. The microcontroller allows a variety of control algorithms to be used depending upon the application.

Another aspect of the present invention comprises an improved direct current power supply controller scheme utilizing a standard alternating current input voltage. The present invention uses a component which integrates a high power MOSFET transistor and a PWM circuit for variable voltage control of the DC output of the system. The voltage control is achieved on the primary side of the transformer which allows the control to take place with a lower current which improves efficiency and minimizes cost as compared with control on the DC side of the transformer.

Another aspect of the present invention comprises a low cost, isolated flyback switching power supply to supply DC power to the thermoelectric device. AC power is rectified and filtered to provide a DC bus across the primary winding of the flyback transformer. The primary is also connected to a three terminal off-line switcher which integrates a power MOSFET transistor and a PWM circuit and which pulse width modulates the DC voltage across the primary at a frequency of one-hundred KHz to provide the field across the primary of the flyback transformer resulting in a DC output to the thermoelectric device to bring and maintain the temperature of the thermoelectric device to the set point temperature.

Another aspect of the present invention comprises a power control circuit for improved temperature control of thermoelectric devices to maintain the temperature of thermoelectric devices at a set point. The circuit includes a rectifying device to provide rectified alternating current when receiving an input from an electrical power source; a flyback power supply to supply a DC voltage to the thermoelectric device; a switching device to modulate the rectified alternating current across the primary of the flyback transformer; a sensor means to monitor the temperature of the thermoelectric device; and a programmable control device to receive an output from the sensor device and provide a control signal to the switching device, the control signal being determined by the difference between the sensed temperature of the thermoelectric device and the desired set point to allow the DC voltage to the thermoelectric device to bring the temperature of the thermoelectric device to the set point and maintain the temperature of the thermoelectric device at the set point.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which.

DETAILED DESCRIPTION

Figure 1:
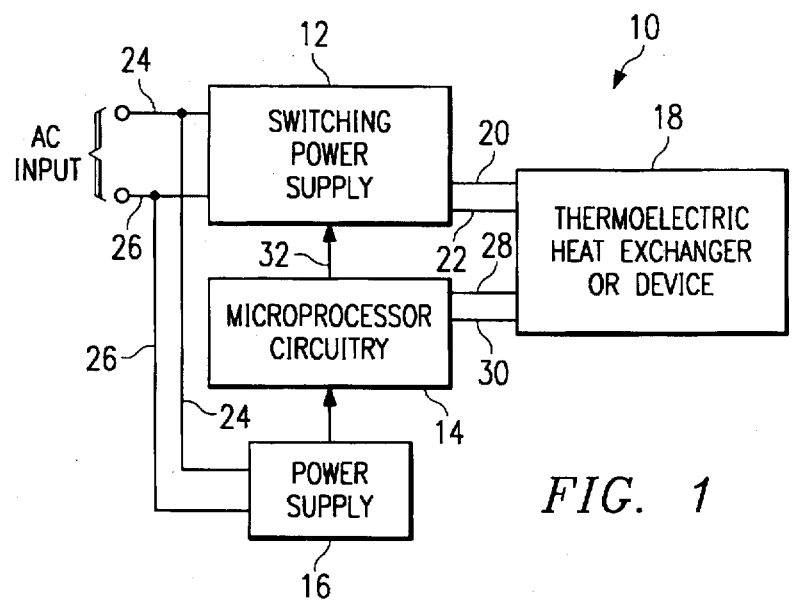
FIG. 1 is a block diagram of the inventive power control circuitry operatively connected to a thermoelectric heat exchanger.

Referring to FIG. 1, there is shown in block diagram form, a power control circuit 10 operatively connected to a thermoelectric heat exchanger or device 18. Power control circuit 10 comprises switching power supply 12, microcontroller or microprocessor circuitry 14 and power supply 16. The DC voltage output from switching power supply 12 is supplied to the thermoelectric heat exchanger or device 18 via leads 20 and 22. An AC input voltage is provided to the switching power supply 12 via leads 24 and 26. Sensor means, which includes a thermistor placed on the thermoelectric heat exchanger 18, provides a signal to microprocessor circuitry 14 via leads 28 and 30 which provides a relative indication of the temperature of the thermoelectric heat exchanger 18. Microprocessor circuitry 14 provides a control signal to switching power supply 12 via lead 32. The AC input voltage is also provided to power supply 16 via leads 24 and 26. The output of power supply 16 provides the necessary DC voltages for the microprocessor circuitry 14.

Upon applying power to the power control circuit 10, microprocessor circuitry 14 reads the signal on leads 28 and 30 and determines the deviation from the set point temperature of the thermoelectric heat exchanger 18. Based upon the deviation from the set point temperature of the thermoelectric heat exchanger 18 and the desired programmed or set point temperature in the microprocessor circuitry 14 for the thermoelectric heat exchanger 18, a control signal is sent via lead 32 to the switching power supply 12 causing the DC output voltage of the switching power supply 12 to reach a maximum value which will cause the temperature of the thermoelectric heat exchanger 18 to decrease toward the desired programmed or set point value. Upon passing below or overshooting the desired temperature, the DC output voltage to the thermoelectric heat exchanger 18 will be decreased to a lower value until the temperature of the thermoelectric heat exchanger 18 increases or overshoots the desired temperature. This hunting process of the temperature of the thermoelectric heat exchanger 18 and the DC output voltage of the switching power supply 12 will continue for a short period until settling in on the value of the DC output voltage which maintains the temperature of the thermoelectric heat exchanger 18 at the desired set point value. The control loop of sensed temperature of the thermoelectric heat exchanger 18, the microprocessor circuitry 14 and switching power supply 12 will cause the DC output voltage to change in value to maintain the temperature of the thermoelectric heat exchanger 18 at the desired programmed or set point temperature.

Figure 2:
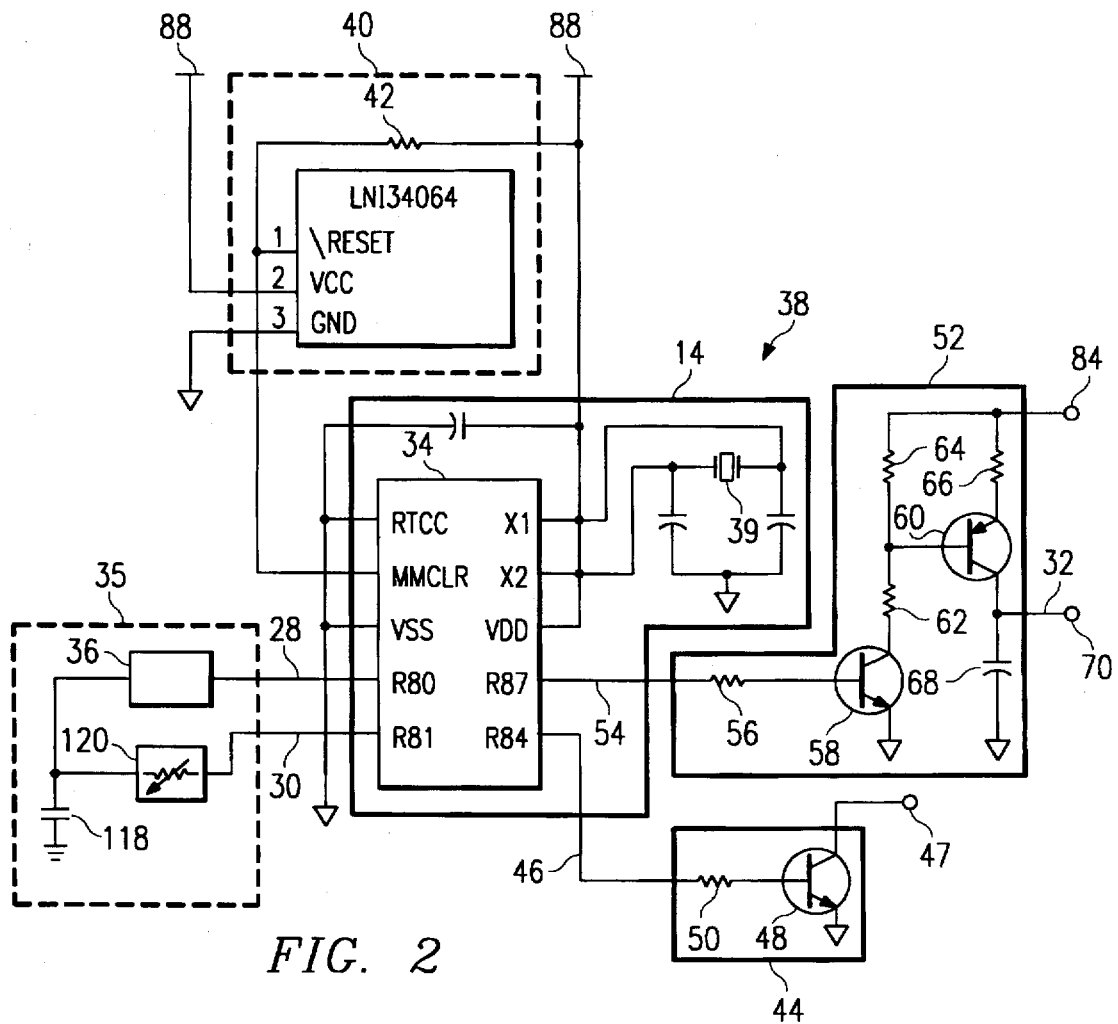
FIG. 2 is an electrical diagram of control circuitry of the present invention.

Referring now to FIG. 2, the microprocessor circuitry 14 comprises microprocessor 34 which in the preferred embodiment is a PIC 16C54 and which is programmable. Sensor means 35 comprises temperature sensor circuitry which includes thermistor 36 connected in series with potentiometer 120 and connected between terminals RB0 and RB1 of microprocessor 34 via leads 28 and 30 and further includes capacitor 118 connected between ground and a point between thermistor 36 and potentiometer 120. Sensor means 35 provides a signal to microprocessor 34, via leads 28 and 30, which provides a relative indication of the temperature of the thermoelectric heat exchanger 18. The function performed by sensor means 35 will be discussed later when the operation of the power control circuit 10 is discussed. Thermistor 36 is physically attached to the thermoelectric heat exchanger 18 and provides a relative indication of the temperature of the thermoelectric heat exchanger 18. Known values of resistance of the thermistor 36 indicate known values of temperature of the thermistor 36.

In setting the value of the resistance of the potentiometer 120, the theoretical value of resistance of the thermistor 36 is determined when the thermoelectric heat exchanger 18 is at the desired or set temperature. The resistance of the potentiometer 120 is then set to that value. For example, if the resistance of the thermistor 36 is twenty-six Kohms when the thermoelectric heat exchanger 18 is at the desired or set temperature of, for example, 4° C., then the potentiometer 120 is set to twenty-six Kohms so that the resistance of potentiometer 120 equals the resistance of the thermistor 36 at the desired or set point temperature for the thermoelectric heat exchanger 18.

Clock circuitry 38 with crystal 39 provides the needed clock function to microprocessor 34. Protection circuitry 40 includes an LNI34064 and resistor 42 connected from the regulated +5 volts DC to the reset terminal of the LNI34064. Protection circuitry 40 provides protection to microprocessor 34 from an under-voltage condition of the regulated +5 volts DC. Delay circuitry 44 receives an input from microprocessor 34 via lead 46 and provides an output to the switching power supply 12 on terminal 47. Delay circuitry 44 comprises transistor 48 and resistor 50. The function performed by delay circuitry 44 will be discussed with respect to FIG. 4. The PWM control signal output from microprocessor 34 goes to output drive circuitry 52 via lead 54 through resistor 56. Output drive circuitry 52 comprises transistor 58 and transistor 60. The collector terminal of transistor 58 is connected to +12v DC through series resistors 62 and 64 and the emitter terminal is connected to ground. The base terminal of transistor 60 is connected between resistors 62 and 64 while the emitter is connected to +12v DC through resistor 66. The collector of transistor 60 is connected to ground through capacitor 68. An output from the output drive circuitry is provided at terminal 70 to the switching power supply 12.

Figure 3:
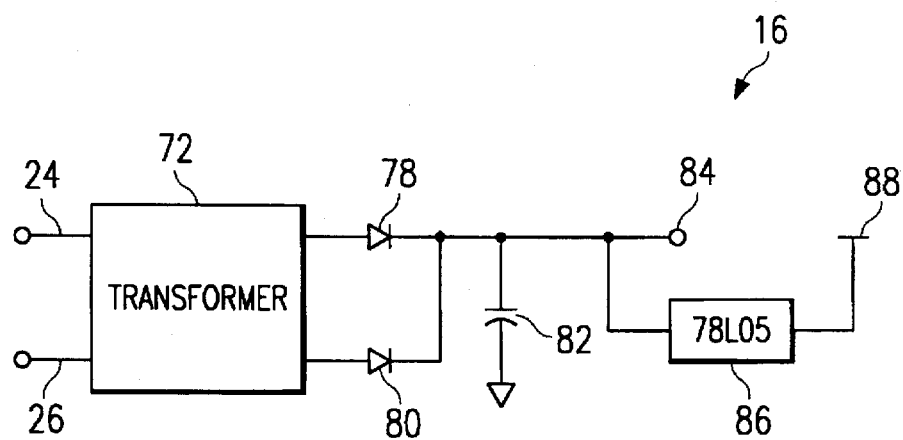
FIG. 3 is an electrical diagram of the power supply of the control circuitry.

Referring now to FIG. 3, power supply 16 comprises transformer 72 which receives an AC voltage input on leads 24 and 26. It will be appreciated that transformer 72 may be configured, by strapping means, to receive either 110v AC @ 60 Hz or 220v AC @50–60 Hz on the primary side and provide the appropriate desired voltage on the secondary side. Diodes 78 and 80 rectify the AC voltage which is filtered by capacitor 82 and +12v DC is provided at terminal 84. The +12v DC is provided as an input to voltage regulator 86 whose output is a regulated +5v DC on terminal 88. It will be appreciated that power supply 16 provides the voltages required by microprocessor circuitry 14.

Figure 4:
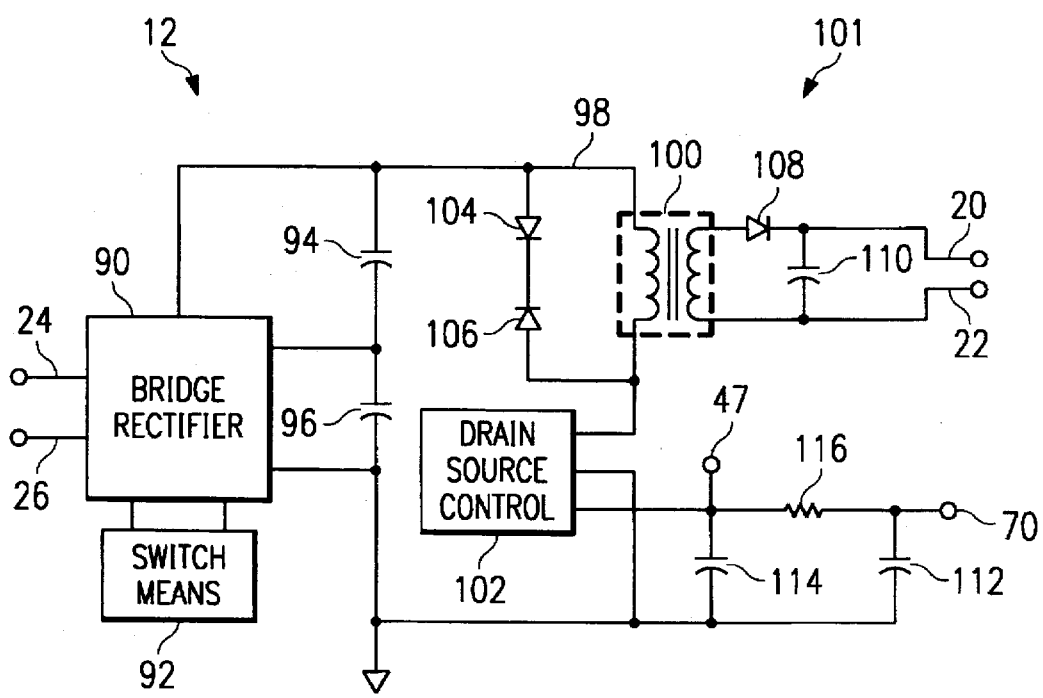
FIG. 4 is an electrical diagram of the switching power supply of the present invention.

With reference to FIG. 4, switching power supply 12 comprises bridge rectifier 90 with switch means 92 to allow bridge rectifier 90 to receive either 110v AC or 220v AC on leads 24 and 26. The output of the bridge rectifier 90 is filtered by series capacitors 94 and 96 which turn the rectified AC signal into a DC voltage on lead 98. With an AC input of 110v AC, the value of the DC voltage on lead 98 is 155–160v DC and with an AC input of 220v AC, the value of the DC voltage on lead 98 is 300–310v DC before being modulated by switching means 102. The primary of flyback transformer 100 of flyback power supply 101 is connected between the DC voltage on lead 98 and ground through switching means 102. In the preferred embodiment, switching means 102 comprises TOPSwitch PWR-ST202A from Power Integrations, Inc. which incorporates a MOSFET transistor and PWM circuitry into a single package. Switching means 102 pulse width modulates or chops the DC voltage (lead 98) at a frequency of one-hundred (100) KHz to provide the field across the primary of flyback transformer 100. Diodes 104 and 106 are connected in series across the primary of flyback transformer 100 to clamp the leading voltage spike to a reasonable value and reduce the ringing that occurs. The secondary of flyback transformer 100 is connected to output leads 20 and 22 which are connected to the thermoelectric heat exchanger 18. Diode 108 is connected in the secondary to keep the current in the secondary from flowing in the reverse or wrong direction during the times that current is not flowing in the primary. Capacitor 110 is a filter capacitor that turns the flyback transformer's output into a smooth DC voltage from the flyback power supply 101 for the thermoelectric heat exchanger 18.

The PWM output signal of output drive circuitry 52 is input to the switching power supply 12 at terminal 70. Filter capacitors 112 and 114 together with resistor 116 filter the PWM signal input to the control pin of switching means 102. The output of the delay circuitry 44 is input to the switching power supply 12 at terminal 47.

In operation, AC power is applied to the power control circuit 10 and power supply 16 powers up and provides +12v DC and regulated +5v DC to microprocessor 34 which then provides various outputs. One output being a signal to delay circuitry 44 whose output at terminal 47 (terminal 47 is pulled to ground) inhibits the operation of switching means 102 until the circuits of the power control circuit 10 are stabilized. Microprocessor 34 outputs four pulses to thermistor 36 from terminal RB0 via lead 28. The four pulses are discharged through capacitor 118 and the decay rate is monitored by microprocessor 34 via terminal RB1. Next, microprocessor 34 outputs four pulses to potentiometer 120 from terminal RB1 via lead 30. These four pulses are discharged through capacitor 118 and the decay rate is monitored by microprocessor 34 via terminal RB0. These two decay rates are compared in microprocessor 34 and the microprocessor 34 determines the deviation from the set point temperature of the thermoelectric heat exchanger 18. There is a PID control loop in the program for microprocessor 34 and assuming that the temperature of the thermoelectric heat exchanger 18, as shown by the difference in the two decay rates, is higher than the desired set point temperature of four degrees C, microprocessor 34 will output a proper signal (a PWM signal) to transistor 58 which in turn drives transistor 60 whose output is provided to the switching power supply 12 on terminal 70. The AC input to bridge rectifier 90 results in a DC voltage on lead 98. By this time, delay circuitry 44 has removed the inhibit signal from terminal 47 and the PWM signal from microprocessor 34 and output drive circuitry 52, on terminal 70, drives the control pin of switching means 102. Switching means 102 will PWM or chop the DC voltage on lead 98 at a frequency of one-hundred (100) KHz to provide the field across the primary of flyback transformer 100 resulting in an output of between 0v DC to $V_{max}$ to the thermoelectric heat exchanger 18. The total power that is applied to the primary of the flyback transformer 100 depends upon the feedback from the sensor means 35/microprocessor circuitry 14. Less modulation results in a lower value of DC voltage applied to the thermoelectric device 18. The DC voltage to the thermoelectric device 18 can be varied in less than one volt steps. The applied DC voltage will cause the temperature of the thermoelectric heat exchanger 18 to decrease toward the desired set point value. It will be appreciated that the microprocessor 34 will continue to send the pulses to the sensor means 35 and will continue to monitor the associated decay rates. Upon passing below or overshooting the desired temperature, the DC output voltage to the thermoelectric heat exchanger 18 will be decreased to a lower value until the temperature of the thermoelectric heat exchanger 18 increases or overshoots the desired temperature. This hunting process of the temperature of the thermoelectric heat exchanger 18 and the DC output voltage of the switching power supply 12 will continue for a short period until settling in on the value of the DC output voltage which maintains the temperature of the thermoelectric heat exchanger 18 at the desired set point value of temperature. This point occurs when the resistance of the thermistor 36 and the resistance of potentiometer 120 are the same and the monitored decay rates are the same. It will be appreciated that the power control circuit 10 will continue to monitor the temperature of the thermoelectric heat exchanger 18 and provide the necessary DC output voltage to the thermoelectric heat exchanger 18 to maintain the thermoelectric heat exchanger 18 at the desired set point temperature.

It is thus believed that the operation and construction of the present invention will be apparent from the foregoing description. While the apparatus shown or described has been characterized as being preferred it will be obvious that various changes and modifications may be made therein without departing from the spirit and scope of the invention as defined in the following claims.

What is claimed is:

1. A power control system for a thermoelectric device to maintain the temperature of the thermoelectric device at a set point, said power control system comprising:

rectifying means for producing rectified alternating current when receiving an input of alternating current power;

a flyback power supply including a flyback transformer having a primary winding and a secondary winding, said secondary winding including means to rectify any AC voltage produced therein and produce a DC voltage, said secondary winding operatively connected to said thermoelectric device to power said thermoelectric device with the DC voltage from said means to rectify;

switching means having a control input, said switching means and said primary winding of said flyback transformer are connected in series between said rectified alternating current and ground, said switching means, when activated, modulates the rectified alternating current across the primary winding of the flyback transformer to provide an AC field across the primary winding which improves efficiency and minimizes component cost compared to control on the secondary winding side of the flyback transformer;

sensor means operatively positioned to monitor the temperature associated with said thermoelectric device; and programmable control means to receive an output from said sensor means and provide a control signal to said control input of said switching means, said control signal being determined by the difference between the sensed temperature of said thermoelectric device and the desired set point of said thermoelectric device to allow the DC voltage to the thermoelectric device to bring the temperature of the thermoelectric device to the set point and maintain the temperature of the thermoelectric device at the set point.

2. The system as set forth in claim 1 wherein said input of alternating current power is about 115 volts AC @60 Hz.

3. The system as set forth in claim 1 wherein said input of alternating current power is about 220 volts AC @50–60 Hz.

4. The system as set forth in claim 1 wherein said rectifying means comprises a bridge rectifier.

5. The system as set forth in claim 1 wherein said switching means comprises a MOSFET transistor operatively connected to a pulse width modulation circuit.

6. The system as set forth in claim 1 wherein said sensor means comprises temperature sensor circuitry operatively positioned with respect to said thermoelectric device and providing an input to the programmable control means.

7. The system as set forth in claim 6 wherein said temperature sensor circuitry comprises a thermistor and a potentiometer connected in series across the input to the programmable control means and further comprising a capacitor connected between ground and a point between the thermistor and the potentiometer.

8. The system as set forth in claim 1 wherein said programmable control means comprises a microprocessor and associated software.

9. The system as set forth in claim 8 wherein said associated software includes a PID control loop program.

10. The system as set forth in claim 1 wherein said control signal from said programmable control means comprises a pulse width modulated signal.

11. The system as set forth in claim 1 wherein said switching means, when activated by said control signal from said programmable control means, pulse width modulates the rectified alternating current across the primary winding of the flyback transformer at a frequency of one-hundred KHz.

12. The system as set forth in claim 1 further including delay means which receives an input from said programmable control means and provides an output to said control input of said switching means to inhibit operation of said switching means upon initial turn-on of the system.

13. The system as set forth in claim 1 wherein said DC voltage to said thermoelectric device has a maximum value of about +12v DC.

14. The system as set forth in claim 1 wherein said programmable control means controls the value of the DC voltage to said thermoelectric device in less than one volt steps.

15. A method of controlling the application of power to a thermoelectric device to maintain the temperature of the thermoelectric device at a set point, said method comprising the steps of;

producing rectified alternating current when receiving an input of alternating current power;

providing a flyback power supply to supply a DC voltage to said thermoelectric device, said flyback power supply includes a transformer;

providing switching means;

connecting said switching means and the primary of the transformer of said flyback power supply in series between said rectified alternating current and ground;

determining the operating temperature of said thermoelectric device;

providing programmable control means to receive an indication of said operating temperature of said thermoelectric device and provide a control signal to said switching means causing said switching means to modulate the rectified alternating current across the primary winding of the flyback transformer to produce the correct value of DC voltage to the thermoelectric device to bring the temperature of the thermoelectric device to the set point and maintain the temperature of the thermoelectric device at the set point.

16. The method as set forth in claim 15 wherein said switching means comprises a MOSFET transistor operatively connected to a pulse width modulation circuit.

17. The method as set forth in claim 15 wherein said programmable control means comprises a microprocessor and associated software.

18. The method as set forth in claim 17 wherein said associated software includes a PID control loop program.

19. The method as set forth in claim 15 wherein said control signal from said programmable control means comprises a pulse width modulated signal.

20. The method as set forth in claim 15 wherein said switching means, when activated by said control signal from said programmable control means, pulse width modulates the rectified alternating current across the primary winding of the flyback transformer at a frequency of one-hundred KHz.

21. The method as set forth in claim 15 wherein said DC voltage to said thermoelectric device has a maximum value of about +12v DC.

22. The method as set forth in claim 15 wherein said programmable control means controls the value of the DC voltage to said thermoelectric device in less than one volt steps.

* * * * *